Dec. 2, 1952          J. E. TYLER          2,620,445
APPARATUS FOR DETERMINING DAYLIGHT FLUORESCENCE
Filed April 3, 1951
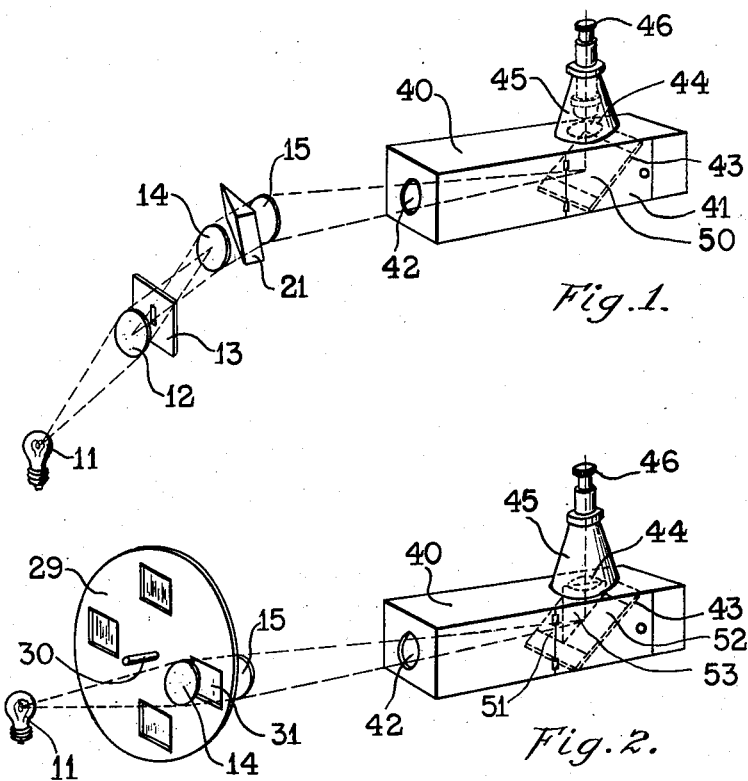
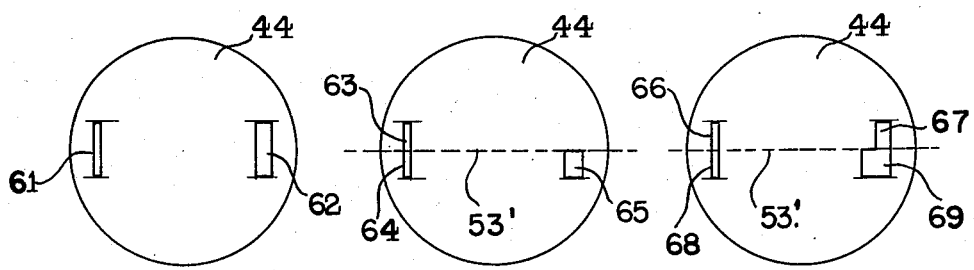
INVENTOR
John E. Tyler
BY *Eric E. Branche*
ATTORNEY Patented Dec. 2, 1952

2,620,445

UNITED STATES PATENT OFFICE 2,620,445

APPARATUS FOR DETERMINING DAYLIGHT FLUORESCENCE

John E. Tyler, Riverside, Conn., assignor to Interchemical Corporation, New York, N. Y., a corporation of Ohio Application April 3, 1951, Serial No. 218,989

2 Claims. (Cl. 250—71)

The present invention relates to a method and apparatus for determining daylight fluorescence.

Some organic dyes are known to exhibit, in dilute liquid or solid solution or if absorbed by solids such as resins, a phenomenon which has been termed "daylight fluorescence." Coatings, say, with resins containing such dyes, have become very useful for signaling and for display purposes because fabrics or sheets coated in this manner can be distinguished at greater distances or under less favorable light conditions than surfaces exhibiting color by the usual reflection-absorption phenomena. Displays having daylight fluorescence coatings are very compelling to the eye.

The particular dyes which exhibit so-called daylight fluorescence are distinguished from others in that they are capable of emitting, in response to radiation at wavelengths which are normally absorbed, visible light of relatively high intensity at a wavelength different and in addition to the light normally reflected. Although, conceivably, there should be many dyes emitting under certain conditions such additional visible light of relatively high intensity, the number of known dyes of this type is small and the few that have been found to fluoresce in daylight were discovered by accident when made up into dilute solutions (see, for example, U. S. Patent No. 2,113,973 of April 12, 1938). Such known dyes are fluorine compounds, such as rhodamine B or rhodamine 6G, sulfonated methylated primuline, or hydroxy phthaleins, such as fluorescein, eosine, etc.

The herein disclosed device serves to facilitate the search for other dyes having sufficient daylight fluorescence so as to make them potentially useful for purposes such as the aforementioned. The device is not only useful for detecting the presence or absence of daylight fluorescence, but its utility extends to a determination of the kind and relative intensity of daylight fluorescence. The method employed comprises the steps of producing a beam of monochromatic light or a beam comprising a narrow wavelength band of light, directing the beam at the specimen to be tested, dispersing the light emerging from the specimen and observing the spectral distribution thereof as to whether or not visible radiation of other than the incident spectral quality and in addition thereto is emitted from the specimen.

The invention will be readily understood by referring to the drawings, wherein Figs. 1 and 2 are modifications of the herein claimed instrument, while Figs. 3, 4 and 5 are schematic illustrations of dark field views of specimens under observation.

Fig. 1 shows a continuous light source 11 mounted so as to throw a beam at the lens 12 positioned in front of the slit plate 13. Light passing from the slit is focused onto the lens 14 of the lens pair 14, 15 which is placed on either side of the prism monochromator 21 in order to collimate the light through the prism and, after the light having passed through the port 42 of the box 40, to focus it on the inclined base plate 43 inside the box. In order to eliminate stray radiation the interior of the box including the inclined base plate should be painted black. The box is accessible through the door 41 to permit placing the sample 50 onto the base plate. The sample consists, preferably, of a piece of paper or any other suitable sheet coated with a solution or dispersion of the material to be tested for daylight fluorescence. Preferably, the specimen is clamped onto the base plate which is set at an angle of 45° with respect to the incident beam so as to cause light emerging from the specimen to pass through the opening 44 thereabove and to enter the spectroscope 45 wherein any heterochromatic light is split into its monochromatic components which are then observed in the dark field visible through the eye piece 46.

With a specimen that does not show daylight fluorescence, a single colored line such as indicated at 61 in Fig. 3 will be visible. The location of that line within the dark field and the intensity thereof will depend upon the wavelength of the incident light and the monochromatic reflectance of the sample at this wavelength. With a specimen having daylight fluorescent properties, in addition to the said colored line, a colored band 62 will be visible, normally located in a region of longer wavelength than that of the reflected light. Appearance of this band is proof of daylight fluorescence. Because of the fact that daylight fluorescence occurs, in most instances, within a plurality of adjacent wavelengths rather than in one wavelength, 62 will be a band rather than a narrow line. When testing for daylight fluorescence, it is necessary to use incident light of different wavelengths because if the operator were to confine himself to one monochromatic light or to a specific narrow spectral band, this wavelength could coincide with the wavelength of the fluorescent radiation of the speciment. In this instant the reflected and emitted light would be spectrally identical and the observer would fail to elucidate the daylight fluorescent properties of the specimen.

According to the modification illustrated in Fig. 2, light of a narrow wavelength band is used instead of monochromatic light. Such narrow wavelength band radiation is obtained by means of so-called interference filters. These interference filters consist of glass plates having composite coatings of, say, a conductor and a dielectric material, the film thicknesses of which are carefully controlled. In order to obtain transmittance of a given, narrow wavelength band of radiation, the film thicknesses are made integral number of the half wavelength of the desired radiation. While light of this particular wavelength is transmitted, the filter does not transmit radiation in the visible region of the spectrum that differs in wavelength substantially from the desired monochromatic light.

For the herein disclosed purpose, continuous light from the source 11 is passed between a conventional optical arrangement comprising the lenses 14 and 15, to focus the light on the inclined base plate 43. These lenses are placed on either side of an interference filter such as shown in 31. I find it practical to mount the necessary plurality of interference filters transmitting narrow wavelength bands of radiation at different regions of the spectrum in suitable apertures of the vertical disk 29, which can be turned around the axis 30.

The box assembly is essentially the same as illustrated in Fig. 1, except that the beam focused onto the inclined base plate 43 is split into a left and into a right portion by means of the vertical partition 53 which is shaped and mounted in such a way that the lower edge thereof does not rest against the inclined base plate 43 but closely parallels the surface of the latter. This arrangement permits the insertion of a sheet which has been coated with two different materials next to each other and to compare these materials.

If, say, a coating 51 at the left of the sheet and a coating 52 at the right exhibit the same reflectance under the influence of a given monochromatic or narrow wavelength band radiation, the colored lines 63 and 64 indicated in Fig. 4 will be visible in the dark field, having the same spectral location. However, if the coating 52 has daylight fluorescent properties in addition, a colored band 65 will be visible in the proper half of the field. In the absence of daylight fluorescent properties in coating 51, there will be no such band on the other side of the invisible line 53' which is the projection of the dividing line between the two specimens as well as of the partition 53 that splits the beam of incident light.

The intensity of the daylight fluorescence of a material is predicated, in part, upon the physical state of the specimen in question, for example, upon its concentration, particle size, etc. The arrangement set forth in Fig. 2 permits a quantitative estimation of the degree of daylight fluorescence of two samples of the same material in different physical states.

By means of the herein claimed device different daylight fluorescent materials can be compared with each other with respect to the intensity and spectral location of the fluorescent wave band. Fig. 5 depicts the dark field view of two different daylight fluorescent materials having the same reflectance. As shown, they differ in the width of their fluorescent bands 67 and 69, respectively. In addition, relative light intensity of the fluorescent bands can be evaluated by the observer.

I claim:

1. A testing device for daylight fluorescence, comprising means for generating a chosen beam of narrow wavelength band radiation in the visible part of the spectrum, a black box having an aperture on one side for the beam to enter the said box, an inclined sample support mounted in the path of the said beam inside the box, an aperture on top of the said box aligned to permit passage of light emerging from a sample placed on said support, and a spectroscope placed over the said aperture on top of the box.

2. A testing device according to claim 1 permitting the simultaneous observation of two samples suitably mounted in the path of the said beam inside the box, comprising means for separately illuminating one-half of the spectroscope slit with light emitted by one sample and illuminating the other one-half of the spectroscope slit with light emitted by the other sample.

JOHN E. TYLER.

REFERENCES CITED

The following references are of record in the file of this patent:

UNITED STATES PATENTS

| Number | Name | Date |
|---|---|---|
| 1,195,912 | Cummings et al. | Aug. 22, 1916 |
| 1,727,173 | Muller | Sept. 3, 1929 |
| 1,960,097 | Barnard et al. | May 22, 1934 |
| 2,234,278 | Richter | Mar. 11, 1941 |
| 2,417,383 | Switzer | Mar. 11, 1947 |
| 2,478,745 | Cornwall | Aug. 9, 1949 |